Sept. 11, 1951 J. R. DILLON 2,567,425
SPEED SIGNAL SYSTEM
Filed June 28, 1949 2 Sheets-Sheet 1
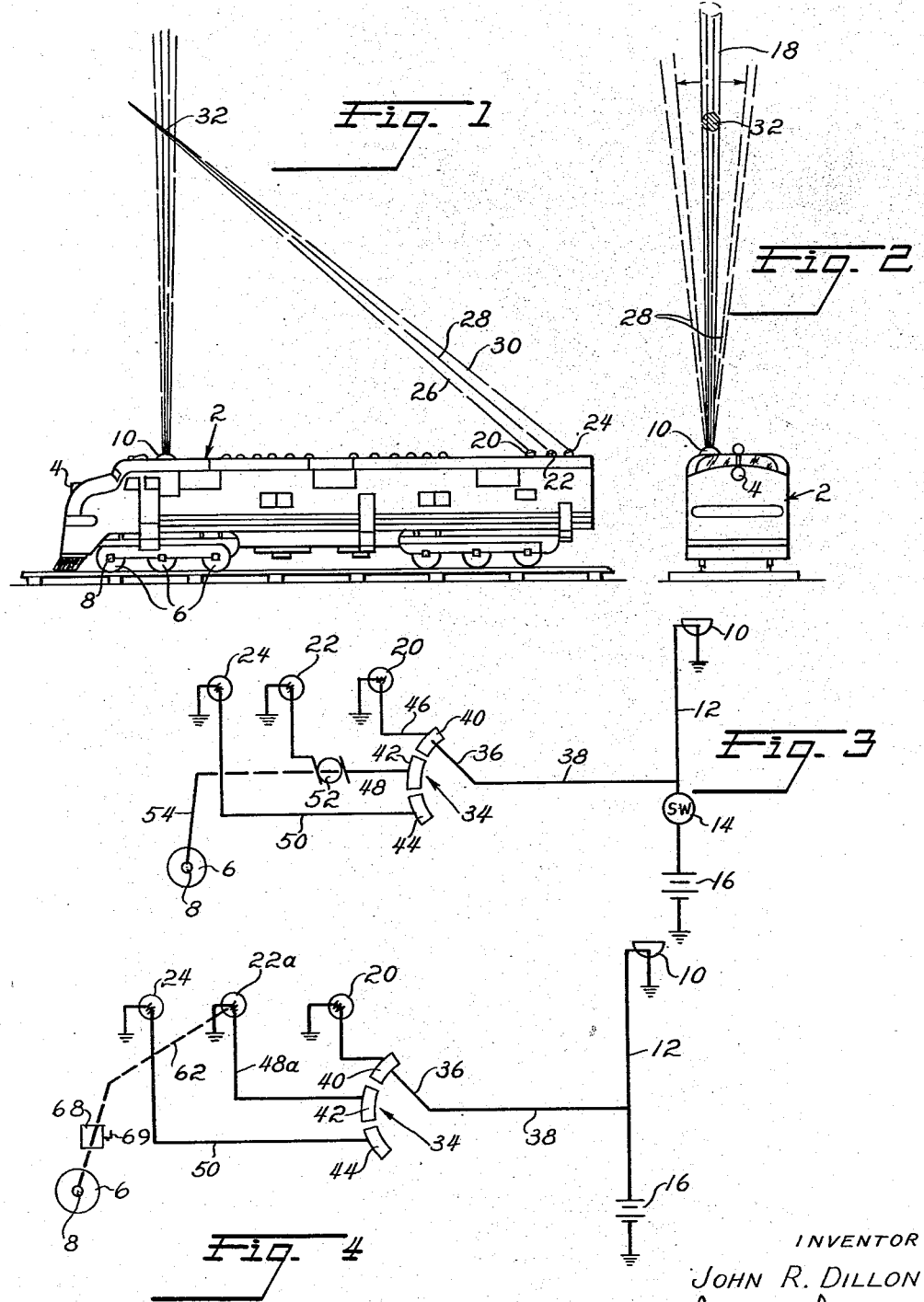
INVENTOR
JOHN R. DILLON
James H. Littlepage
ATTORNEY Sept. 11, 1951 J. R. DILLON 2,567,425
SPEED SIGNAL SYSTEM
Filed June 28, 1949 2 Sheets-Sheet 2

INVENTOR
JOHN R. DILLON

ATTORNEY

Patented Sept. 11, 1951

2,567,425

UNITED STATES PATENT OFFICE 2,567,425

SPEED SIGNAL SYSTEM

John R. Dillon, Raleigh, N. C.

Application June 28, 1949, Serial No. 101,847

4 Claims. (Cl. 177—311.5)

This invention relates to signal systems for vehicles and, more particularly, a light signal system for locomotives.

The primary object of the invention is to provide a light signal visible from great distances at night so that the momentary place and running condition of a train can be observed from afar. Under prior arrangements based on the block system having red, orange, and green block lights the existence of a train in, for instance, the second block in front is determined by an orange, or caution light in the fixed signal immediately ahead. However, from the fixed signal it is impossible to determine where or how fast the train ahead is running, or even whether it is running at all. Collisions have resulted in instances where a leading train was stopped or was slowly proceeding in the first part of its block and a fast following train has come past an orange block signal and reasonably promptly slacked down, but yet come through the red signal and into the rear end of the leading train, sometimes with all brakes set from the time the red block signal was observed. The object now is to provide a system wherein a following train engineer can estimate accurately the place and running conditions and speed of a leader from distances at least as great as the second block back.

A more particular object is to provide a light signal system wherein a light signal spot is displayed at considerable height above a locomotive and wherein at night an observable signal of one sort or another will always be present. In accordance with these objects it is now proposed to provide a system including a clear fixed light of great intensity shining a white beam upwardly, preferably from the fore part of a locomotive, and a set of red, orange and green lights preferably on the rear of the locomotive and projecting colored beams upwardly at fixed angles so as to intercept the white beam and thereby create a colored spot high above the locomotive. It is further intended to modulate the orange light in accordance with the speed of the locomotive so as to create an intermittent orange spot recurring at a frequency corresponding to the locomotive speed.

These and other objects will be apparent from the following specification and drawings, in which:

Fig. 1 is a side elevation of a locomotive utilizing the invention;

Fig. 2 is an end view of the locomotive shown in Fig. 1;

Fig. 3 is a circuit diagram of the lightening system;

Fig. 4 is a circuit diagram of an alternate circuit;

Figure 5:
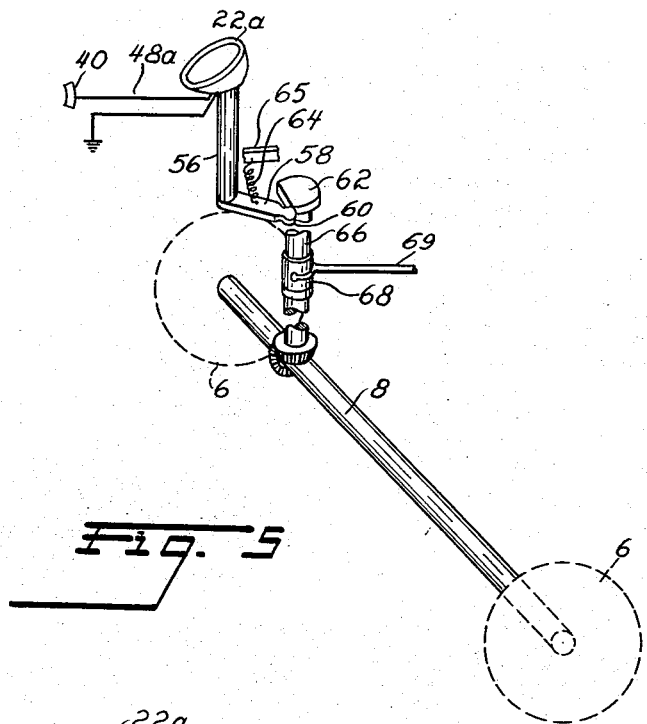
Fig. 5 is a diagram illustrating a mechanical linkage utilized with the Fig. 4 arrangements.

Referring now to the drawings, in which like reference numerals denote similar elements, the locomotive shown in Figs. 1 and 2 is conventional and includes the usual headlight 4, engine, electric power and auxiliary elements not shown, and wheels 6, at least some sets of which have driving axles 8.

The invention concerns the light signal system wherein a vertically disposed searchlight 10 is mounted, preferably near the front on the top of locomotive 2. Searchlight 10 is provided with a clear lens and is of relatively high candle-power so as to project a fixed, intense white vertical beam 18 of small cross-section high into the night sky. As shown in Figs. 3 and 4, searchlight 10 is supplied with electric current through a circuit 12 controlled by switch 14 and deriving current from the battery 16 of the engine's electrical power system.

Spaced from searchlight 10 and mounted preferably near the rear on the top of engine 2 are red, orange, and green spotlights 20, 22, and 24, respectively. It will be understood that these spotlights are of conventional construction with approximately colored lenses or filters, and are focused so as to project red, orange, and green beams 26, 28 and 30 upwardly at forward angles so as to intercept white beam 18 at a given spot 32 high above locomotive 2.

As shown in Fig. 3, red and green lights 20 and 24 are steady and selectively energized through a selector switch 34 whose armature 36 is connected by circuit 38 to circuit 12 so that whenever switch 14 is closed, current will flow to armature 36 and one of the spotlights constantly, red spotlight 20 being energized via switch segment 40 and circuit 46 and green spotlight 24 being energized via segment 44 and circuit 50. Switches 14 and 34 are, of course, conveniently placed at the operator's station in locomotive 2.

Orange spotlight 22 is intermittently energized via circuit 48 connected to segment 42 but including a commutator 52 mechanically coupled by a flexible drive 54 to a drive shaft 6 of locomotive so as to make and break the electrical supply circuit to orange spotlight 22 in accordance with the speed of the locomotive. While a simplified version of the system is shown, it will be understood that various rotational power takeoffs may be utilized to drive commutator 52, such as the locomotive speedometer shaft. However, in order that the flashing of orange spotlight 22 be readable so as to gauge the pace of the locomotive 2, the arrangement of the segments of commutator 52 and the gearing of its drive should keep the flashing frequency down well below that at which the phenomena of persistence of vision comes into play lest, at high speeds, orange spotlight 22 appears to be on constantly. In the preferred embodiment commutator 52 is synchronized with the speed of locomotive so as to energize orange spotlight 22 once per second at ten miles per hour and, of course, 6 per second at 60 M. P. H. and 9 per second at 90 M. P. H.

The modification shown in Figs. 4 and 5 is similar to the Figs. 1-3 embodiment except that orange light 22a is of steady illumination but is oscillated so as to sweep its beam back and forth across beam 18. The mechanism for oscillating light 22a may be generally of the type now embodied in oscillating headlamps but with relatively little oscillatory movement. A suitable mechanism diagrammatically illustrated includes an energizing circuit 48a leading from selector switch segment 42, a vertical shaft 56 rotatably supported on suitable bearings at the top of locomotive, an arm 58 fixed on shaft 56, a cam follower 60 on the free end of arm 58, and a cam 62 against which the cam follower is held by a spring 64 engaged at 65 between locomotive 2 and arm 58. Cam 62 is rotated by a shaft 66 operatively connected to the driving mechanism of the locomotive through a clutch 68 controlled by linkage 69 so that spotlight 22a will oscillate only when desired. Obviously, other oscillatory mechanism synchronized with the speed of the locomotive may be utilized for sweeping the beam orange spotlight 22a across beam 18.

Figure 6:
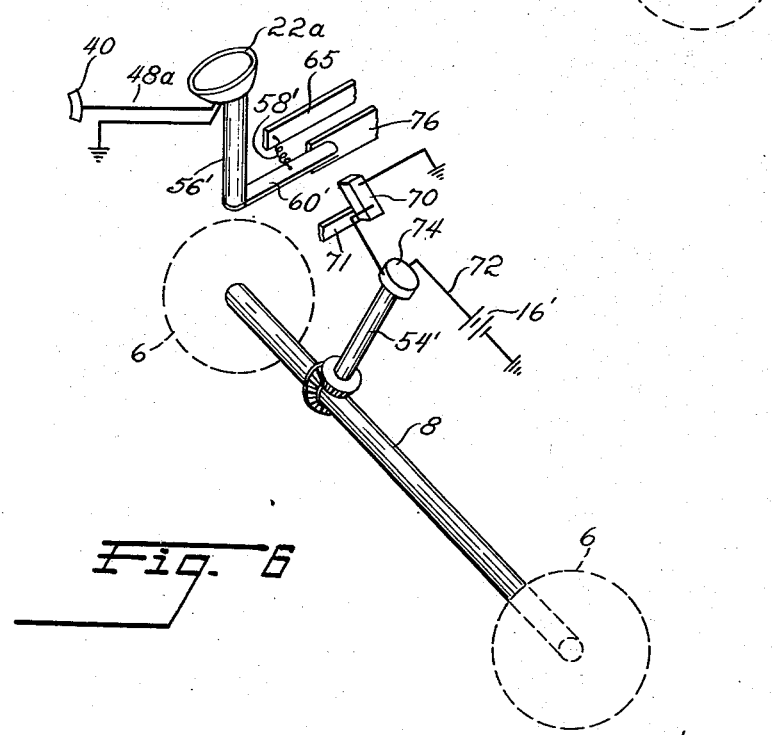
Fig. 6 is a diagram illustrating a solenoid system for modulating the orange spotlight.

The Fig. 6 modification is generally similar to that shown in Figs. 4 and 5 except in that orange spotlight 22a has connected to its supporting shaft 56' an arm 60' which is the armature for a solenoid 70 fixed by a mounting 71 on locomotive 2. Solenoid 70 is energized from a source 16' of current via a circuit 72 interrupted by a commutator 74. Commutator 74 is driven by a conventional shaft arrangement indicated at 54' which, in turn, is geared to a traction element such as shaft 8. Spring 58' having one end fastened on fixed support 65 is arranged in opposition to solenoid 70 normally to hold armature 60' against a stop 76. In the normal position of spotlight 22a, when solenoid 70 is not energized and when armature 60' is against stop 76, the orange beam therefrom intercepts white beam 18. This arrangement is so that should the modulating circuit fail, or should the locomotive stop without moving the selector switch from segment 42, there will be an unmodulated orange spot on white beam 18.

In all night operation of locomotive 2, switch 14 is closed so that white beam 18 projects upwardly and so that one of the colored beams from spotlights 26, 28 or 30 will create a colored spot 32. Assuming locomotive 2 is running in the clear with a green block signal ahead, or has just passed a green block signal, armature 36 of selector switch 34 will be moved to segment 40 so as to energize green spotlight 20, thereby superimposing a green spot at 32 on white beam 18. When locomotive 2 proceeds through an orange block signal or is proceeding otherwise under caution, armature 36 will be moved by the engineer to energize spotlight 22 or 22a, thereby creating an orange spot at 32 pulsating at a frequency proportional to the pace of the locomotive. When locomotive 2 is stopped or otherwise in a vulnerable condition, red spotlight 24 will be energized via approximate adjustment of selector switch 36.

In either embodiment, tell-tale lamps in the locomotive cab may be energized from circuits 46, 50, and 48 or 48a and in railroad systems utilizing automatic train control, selector switch 34 may be automatically operated by the train control system.

The invention thus described is not limited to the specific embodiment detailed above, but is intended to cover all modifications and equivalents within the scope of the following claims:

I claim:

1. An electric light signal for vehicles comprising, in combination, a vehicle, a searchlight mounted on one portion of the vehicle and arranged to project a fixed beam of white light substantially vertically therefrom, a plurality of spotlights mounted on other portions of said vehicles spaced laterally from said searchlight and from one another, said spotlights respectively having red, orange, and green light filters thereon and being angularly disposed with respect to said white beam and with respect to one another so as to project colored light beams in intercepting relationship with said white beam at a spot fixed in height and position with respect to the locomotive substantially above said locomotive, electric circuit means for energizing said searchlight and said spotlights, control means connected with a traction part of said vehicle for producing control impulses proportional in frequency to the speed of said vehicle, and means operated by said control impulses for modulating the spotlight having the orange light filter at a frequency proportional to said speed.

2. The combination claimed in claim 1, bearing means mounting the spotlight having the orange filter for oscillation about a vertical axis, said control means including a rotating shaft geared to said traction element for rotating therewith, said modulating means including an armature affixed to the last-named spotlight eccentrically with respect to said axis, a solenoid juxtaposed with respect to said armature for oscillating the last-named spotlight about its vertical axis, a source of electric current, an electrical connection between said source and said solenoid, and commutator means driven by said shaft for interrupting said connection periodically in accordance with the speed of said vehicle.

3. In the combination claimed in claim 2, spring means operatively arranged between the orange filtered spotlight and said vehicle and operating in opposition to said solenoid for returning last-named spotlight to a normal position, said normal position being that in which the orange colored beam angularly coincides with the white beam.

4. An electric light signal system for denoting to remote observers the location, distance-away, orientation and running condition of a locomotive comprising, in combination, a locomotive having front and rear ends, a searchlight affixed on the locomotive adjacent the front end thereof and arranged to project a steady beam of white light substantially vertically upward therefrom whereby to denote the location of the front end of the locomotive, a plurality of spotlights mounted on the locomotive adjacent the rear end thereof at predetermined fixed distances from said searchlight, said spotlights having respectively different signal color filters thereon and each being angularly affixed with respect to said searchlight so as to project colored light beams in intercepting relationship with said white beam, thereby to produce colored spots on said white beam at a location of predetermined fixed height above the locomotive, whereby the direction of colored beam projection denotes the orientation of the locomotive and whereby the apparent height of the colored spot denotes the distance-away of the locomotive, and means for steadily energizing said searchlight and for selectively energizing said spotlights whereby to denote the running condition of the locomotive.

JOHN R. DILLON.

REFERENCES CITED

The following references are of record in the file of this patent:

UNITED STATES PATENTS

| Number | Name | Date |
|---|---|---|
| 257,403 | Starr | May 2, 1882 |
| 271,348 | Miller | Jan. 30, 1883 |
| 1,666,196 | Cuntz | Apr. 17, 1928 |